Oct. 1, 1929.  C. WASWO ET AL  1,729,808
CONDENSATION PREVENTER FOR WINDOWS
Filed May 22, 1928

Inventors
C. Waswo
C. M. Schenck
By Clarence A. O'Brien
Attorney

Patented Oct. 1, 1929

1,729,808

UNITED STATES PATENT OFFICE

CHARLES WASWO AND CLARENCE M. SCHENCK, OF DUNNELL, MINNESOTA

CONDENSATION PREVENTER FOR WINDOWS

Application filed May 22, 1928. Serial No. 279,730.

The present invention relates to improvements in means for preventing the formation of condensation on windows and is especially adapted for use in conjunction with automobile windshields. Driving in freezing weather while raining, frequently results in the formation of ice on the outside of the windshield, and greatly impairs the vision of the driver. Furthermore, during inclement weather, when the car is completely enclosed, the driver's breath generally produces a mist on the inside of the windshield, which must be frequently wiped off to the inconvenience of the driver.

The object of this invention is to provide a device for association with the automobile windshield, whereby such disadvantages will be eliminated. Another object is to provide a device of the above character which may be permanently associated with a conventional windshield without affecting the driver's vision.

Still another object resides in the provision of a device of this nature which will produce a temperate condition exteriorly of the windshield immediately in front of the driver, sufficiently equivalent to the degree of temperature within the vehicle to prevent the formation of condensation thereon.

Other objects and advantages of this invention will become apparent as the same is better understood from the following specification and claim.

Figure 1:
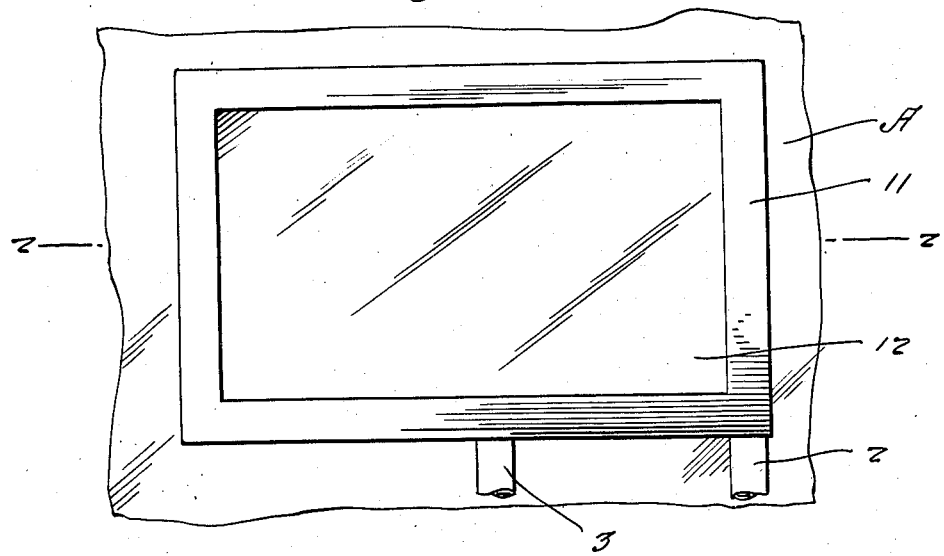
Figure 1 represents a fragmentary portion of a windshield, with the present improved condensation preventer mounted in operable position with respect thereto.

Now for a more lengthy description of this invention, reference is made to the drawings, wherein like numerals designate like parts. For the purpose of illustrating the manner in which this improved device is associated with an automobile, there is illustrated in Figure 1, a fragmentary portion A of a windshield. However, for the purpose of setting out the varied uses of this device, this fragmentary portion A may be regarded as the window of any other structure subject to the same conditions.

In carrying out the present invention, a rectangular shaped tubular frame 1 is provided, and is equipped with an inlet connection 2 and an outlet 3. The upper and lower portions 4 and 5 respectively of the frame, as well as the end portion 6 are formed with circumferentially disposed and spaced slits 7. The opposite end portion of the frame, designated by numeral 8 is constructed without the slits 7, so that the heated air entering through the pipe 2 will pass through the portion 8 to the upper and lower sections 4 and 5 respectively, before the same is expelled.

Figure 2:
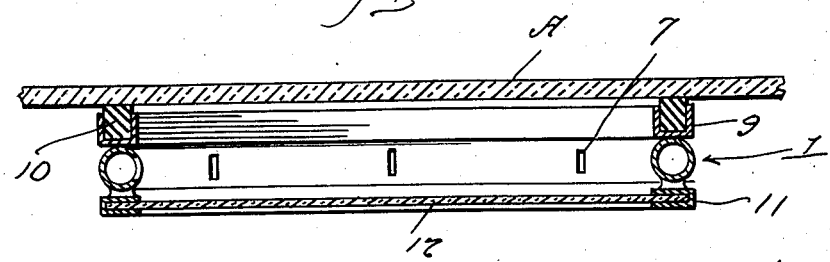
Figure 2 represents a horizontal sectional view through the windshield and condensation preventer construction, the same being taken substantially on the line 2—2 of Figure 1.
Figure 3:
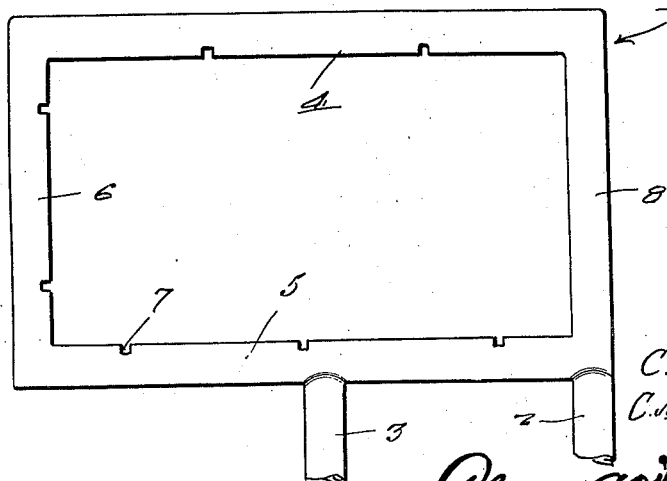
Figure 3 represents the tubular frame from which heated air is expelled against the windshield.

As is clearly shown in Figure 2, a rectangular frame 9 is of substantially U-shaped cross section and to receive an elongated packing strip 10, which is adapted to project at one side beyond the free edge portions of the frame 9, for attachment to the windshield A by cement, clamps, or in fact, any means found suitable. This frame 9 is adapted to be connected at its bight portion to one side of the tubular frame 1, while a third frame 11 is secured to the opposite side of the tubular frame 1, and is constructed to receive a transparent pane 12.

During inclement weather, when the driver's vision becomes impaired by the formation of condensation on the auxiliary pane 12, the driver may open a suitable valve for permitting the exhaust gases of his motor to blow through the pipe 2, and into the tubular frame 1. These hot gases will be expelled through the openings 7, therein, for heating the space between the auxiliary pane 12 and the windshield A. In this manner, the driver wil be able to obtain a clear line of vision through this improved device.

Having thus described our invention, what we claim as new is:

In a condensation preventer for windows comprising a rectangular frame consisting of communicating tubular end and side pieces, said frame being provided with an inlet and an outlet and formed with perforations at its inside portion, a transparent pane receiving frame secured at one side of the tubular frame, a third frame secured to the opposite side of the tubular frame of substantially U-shaped cross section, and a packing strip arranged within the last mentioned frame for engagement against the surface of the window.

In testimony whereof we affix our signature.

CHARLIE WASWO.
CLARENCE M. SCHENCK.